United States Patent [19]
Stuart

[11] Patent Number: 5,635,773
[45] Date of Patent: Jun. 3, 1997

[54] HIGH EFFICIENCY, NO DROPOUT UNINTERRUPTABLE POWER SUPPLY

[75] Inventor: Kenneth L. Stuart, Pasadena, Md.

[73] Assignee: Litton Systems, Inc., Woodland Hills, Calif.

[21] Appl. No.: 518,237

[22] Filed: Aug. 23, 1995

[51] Int. Cl.[6] .................................................. H02J 9/00
[52] U.S. Cl. .................................. 307/66; 363/65; 363/71
[58] Field of Search ........................ 307/66, 46; 363/34, 363/65, 71

[56] References Cited

U.S. PATENT DOCUMENTS

| | | | |
|---|---|---|---|
| 4,277,692 | 7/1981 | Small | 307/66 |
| 4,400,625 | 8/1983 | Hussey | 307/66 |
| 5,315,533 | 5/1994 | Stich et al. | 364/480 |

Primary Examiner—Peter S. Wong
Assistant Examiner—Shawn Riley

[57] ABSTRACT

According to the present invention, a high efficiency no-dropout uninterruptible power supply is presented which will provide desired UPS characteristics while reducing or eliminating undesirable characteristics. In particular, simultaneous improvements are achieved in the areas of switchover transfer response time, droop and transients, EMI generation, power efficiency and heat generation, size, weight, ease of waveshaping, and powerline frequency sensitivity. The invention utilizes dual concurrent feedback loops to control utility-backup power transfer and incorporates a novel method of synchronized AC output generation which allows zero-power switching and simple high-frequency waveshaping control.

25 Claims, 5 Drawing Sheets

HIGH EFFICIENCY, NO DROPOUT UNINTERRUPTABLE POWER SUPPLY

BACKGROUND OF THE INVENTION

The present invention relates generally to Uninterruptable Power Supply (UPS) and more specifically to a high-efficiency UPS which provides a smooth transition from utility power to battery power without dropout.

Uninterruptable Power Supplies are used in many electrical and electronic systems to protect against loss or degradation of operation in the event of a utility power outage. A typical UPS system will provide backup power for the protected system from a battery source that is kept charged from the utility. Management of battery charging is often pad of UPS system operation.

UPS systems are commonly referred to as "on-line" or "off-line". An on-line UPS will keep certain electronics circuitry in a powered condition for the purpose of more quickly detecting the presence of a power outage and apply backup power to the protected system. An off-line UPS supplies power to a minimum of electronics circuitry, and in the event of utility power outage other electronic circuitry must be powered up so that the process of transferring to backup power can be implemented.

An example of a prior art on-line UPS system 10 is shown in FIG. 1. Utility Power 11, which in this case is 120 VAC, is applied to Bridge Rectifier 12. Bridge Rectifier 12 rectifies AC into DC (direct current) which is applied to the input of Half-bridge Converter 14. The purpose of Half-bridge Converter 14 is to provide a regulated DC output 16 which, in this example, is 36 volts DC. Output 16 is used for battery charging and for operation of Double Forward Converter 18. Battery charging is supervised by the Battery Monitoring and Charge Control 34, which regulates the output of the Half-bridge Converter 14 to provide the proper charging voltage and current to the 36 volt Battery 38. Battery Monitoring and Charge Control 34 also provides an error signal through Half-bridge Pulse Width Modulator (PWM) 36 which is applied to the control input of Half-bridge Converter 14 and is part of the feedback loop which regulates output 16. Double Forward Converter 18 is used to provide a regulated 60 VDC Output 20. 60 VDC Output 20 is applied to the input of Fullwave (F/W) Bridge Inverter 22, which performs the function of converting the 60 VDC output 20 to a 60 VAC output 24 using Control Signal 30. Control Signal 30 is provided by the F/W Bridge Inverter Controller portion of Forward and F/W Bridge Controller 32. Pulse Width control signal 26 is generated by the Forward Converter Controller portion of Forward and F/W Bridge Controller 32. The input signal 28 to Forward and F/W Bridge Controller 32 contains voltage and/or current information, which is derived from sensors which monitor 60 VDC Output 20. Signal 28 furnishes voltage and load information from which Forward and F/W Bridge Controller 32 generates Pulse Width control signal 26, part of the feedback loop which regulates 60 VDC Output 20. Forward and F/W Bridge Controller 32 also generates control signal 30 which controls operation of F/W Bridge Inverter 22.

The on-line UPS will respond quickly to utility outage occurrences. This can be seen by noting that the Battery 38 is used directly in the power chain, from 36 VDC at Output 16 to 60 VDC at output 20 to the final 60 VAC Output 24. In the event of loss of Utility Power 42, there is nothing to switch—the battery 38 is already "on-line" which means that backup power is immediately available and applied to the protected system. The power efficiency of on-line UPS systems is reduced because two converters, Half-bridge Converter 14 and Double Forward Converter 18, are utilized instead of a single converter which could be more efficient. Most on-line UPS systems use a single inverter operating at the utility AC frequency instead of Double Forward Converter 18 and F/W Bridge Inverter 22, but this results in increased size and weight because low frequency power transformers and wave shaping inductors are required to provide a sine or quasi-square wave output. Note also that two converters generate more complex electromagnetic interference (EMI) characteristics that a single converter.

Referring to FIG. 2, a typical off-line non-switching UPS system 40 is shown. When there is a power outage, the Ferroresonant Transformer 46 is powered by a Regulated DC-AC Inverter 52 operating from the system's standby battery 48. Regulated DC-AC Inverter 52 is normally in a non-operating state until Transfer Controller 54 detects a problem in the AC output 56 at which time Regulated DC-AC Inverter 52 is started and power is applied to Ferroresonant Transformer 46. The major problem with this approach is time lapses, or "drop-outs", between loss of AC mains, sensing that loss, and getting the Regulated DC-AC Inverter 52 in operation. In most UPS systems now in use this results in a momentary loss of output power.

The operation of the off-line non-switching UPS system 40 is as follows. The power available from the Utility Power 42 (120 VAC) is passed through Electronic Switch 44 to the Ferroresonant Transformer 46 which generates a quasi-square waveform, AC output 56. When Utility Power 42 is lost, Transfer Controller 54 senses the drop in AC output 56 and switches off Electronic Switch 44 while switching on Electronic Switch 50 and Battery 48 to Regulated DC-AC Inverter 52. Time is lost in making this transition and in sensing the actual droop in AC output 56 since the output waveshape is highly dependent upon the degree of load current being passed through Ferroresonant Transformer 46. Therefore, the sensing circuits in Transfer Controller 54 will introduce some delay in order to "make sure" that there really is a loss. More sophisticated controllers may also sense Utility Power 42 to bypass the delays in the response of Ferroresonant Transformer 46, but still there is a finite time required to get Regulated DC-AC Inverter 52 on-line from a cold start.

When Utility Power 42 is again available, Transfer Controller 54 waits for some time to retransfer back to Ferroresonant Transformer 46 in order to protect against nuisance transfers, such as momentary power restorations, spikes, and so forth. This time may be as much as one or several minutes. When the transfer is made, however, there is usually a cycle or two of AC lost until Ferroresonant Transformer 46 stabilizes.

Existing UPS design approaches for cable television (CATV) systems typically fall into one of two categories: a) ferroresonant power supplies, and b) switch mode power supplies. Of the two types, the ferroresonant variety is by far the most prevalent due to simplicity of construction but in general has the inability to maintain output when switching from utility power to battery, causing a drop in output which cannot be tolerated in the new generation CATV systems now being developed. The ferroresonant transformer reduces the 120 VAC utility power to the 60 VAC needed for CATV applications, is capable by design of regulating the output voltage versus input line voltage variations and output load current changes, and is simple and cost-effective but suffers from lack of efficiency at all load currents other than its design maximum current. Conventional UPS CATV systems rely upon sensing the loss of utility power and switching to a battery powered inverter to generate the AC output power. A full cycle of AC power (17 mS at 60 Hz) or more can elapse before the inverter comes on-line, during which time power to the CATV system is lost. This loss may be tolerable if only television transmissions are being handled by the cable, but becomes intolerable if digital data is also being transmitted.

The switch mode supply, which does not have this problem, is inefficient in its handling of power which results in higher costs for utility power and a high degree of The switch mode supply, which does not have this problem, is inefficient in its handling of power which results in higher costs for utility power and a high degree of heat production. Power is always being processed by the DC-DC converters even when utility power is present, hence the poor efficiency. There is, however, no switching of the battery converter to bring the battery on-line, and therefore no dropout period. The on-line system is not commonly found in the CATV field due to its poor efficiency.

Off-line and on-line UPS systems both possess advantages which make them attractive for different reasons. The conventional on-line UPS system ensures uninterrupted operation for the protected system while the conventional off-line UPS system offers the advantage of better operating efficiency than the on-line UPS system. There are, however, also disadvantages of both the on-line UPS system and the off-line UPS system. The conventional on-line UPS system is characterized by poor operational efficiency since two, rather than one, converters must be utilized to guarantee continuous operation of the protected system. This required converter circuitry also translates into increased size, weight and EMI concerns for the on-line UPS system. The typical off-line UPS system is characterized by time lapses and spikes when it becomes necessary to use the standby battery rather than utility power to supply power to the protected system. At the current time, a multiplicity of design approaches are necessary in order to compensate for these and other disadvantages of conventional on-line and off-line UPS systems. There is, therefore, an unmet need in the art to have a UPS system that capitalizes on the advantages of conventional on-line and off-line UPS systems while minimizing their disadvantages.

SUMMARY OF THE INVENTION

It would be advantageous in the art to develop a UPS method and structure which would incorporate the best features of both conventional on-line and off-line UPS systems while reducing or eliminating the disadvantages associated with conventional on-line and off-line UPS systems discussed above.

It would further be advantageous in the art to use one basic UPS design approach, instead of a multiplicity of design approaches, for the maximum number of applications.

Therefore, according to the present invention, a UPS system is explained which provides for attenuation of the disadvantages inherent to both conventional on-line and off-line UPS systems outlined above using a single design approach to achieve desired UPS system operational goals, including uninterrupted operation for the protected system, good operating efficiency, and reduced EMI characteristics. The invention utilizes dual concurrent feedback loops to control utility-backup power transfers, and incorporates a novel method of synchronized AC output generation which provides zero-power switching, low power waveshaping and high converter switching frequencies.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE INVENTION

The present invention combines the best features of conventional off-line and on-line UPS systems in a high efficiency, no-dropout UPS. Along with high frequency wave-shaping techniques, high frequency switching to minimize size and weight and the no-dropout advantages of the on-line UPS, high operating efficiency similar to off-line UPS designs is also provided. The UPS of the present invention provides uninterrupted operation to a protected system with no time lapses, or "drop-outs", in operation upon loss of utility power and with a minimum of undesirable EMI characteristics.

Figure 3:
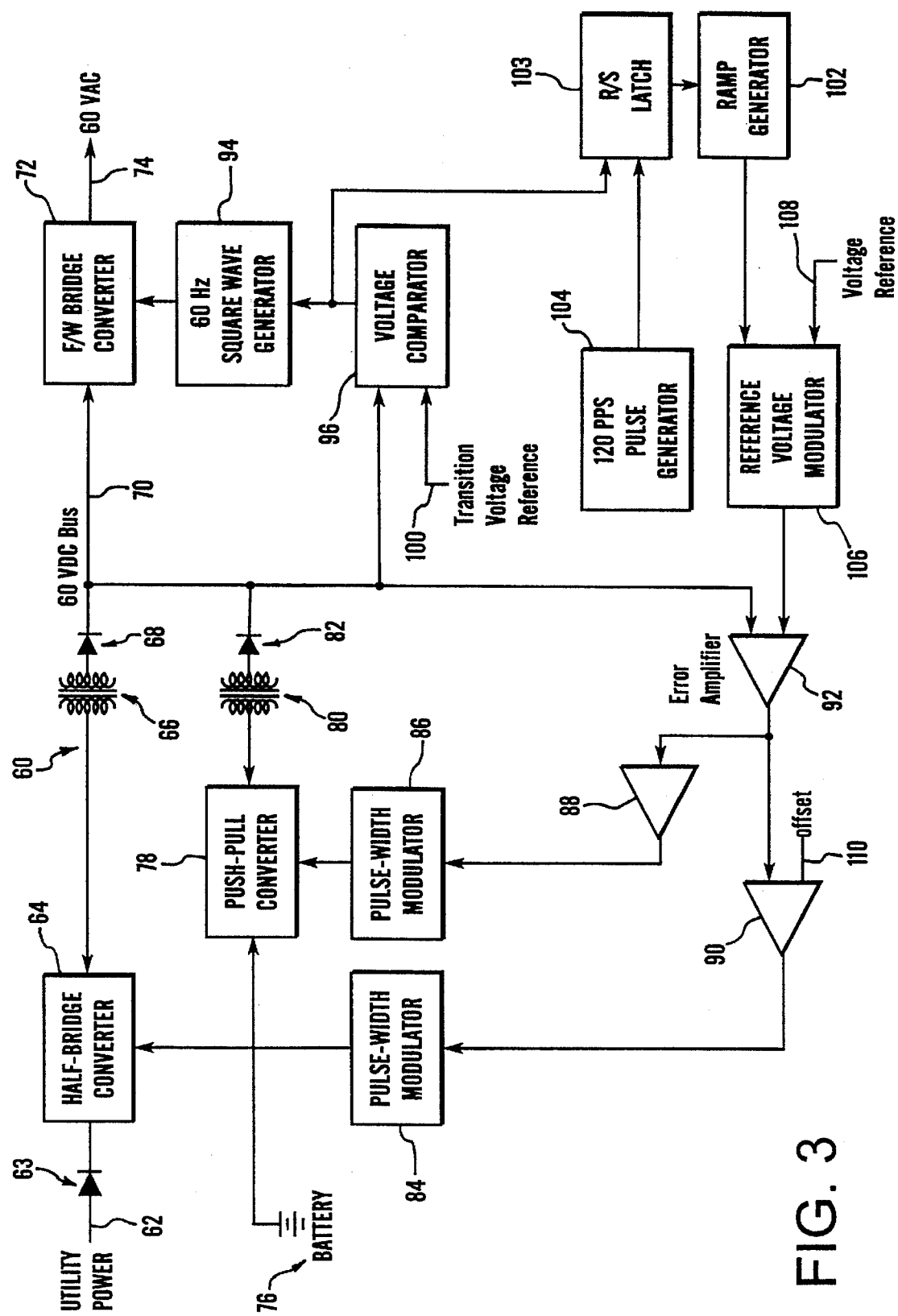
FIG. 3 is an on-line uninterruptible power supply, according to a preferred embodiment of the present invention.

Referring to an On-line Uninterruptible Power Supply (UPS) 60 shown in FIG. 3, we see that Utility Power 62 is rectified by rectifier 63 and the resulting direct current is applied to Half-bridge Converter 64. Half-Bridge Converter 64 generates DC regulated voltage by utilizing high switching frequencies. These high frequencies may vary greatly, from approximately 20 Kilohertz to more than approximately 100 Kilohertz, depending upon the UPS specific application. This is depicted with Switching Transformer 66 and Isolation Diode and Rectifier 68. Half-Bridge Converter 64, under control of Pulse-Width Modulator 84, provides 60 VDC Bus 70. 60 VDC Bus 70 is then applied to F/W (Full-Wave) Bridge Converter 72 which converts the direct current to alternating current to form AC output 74.

Depending on the availability of Utility Power 62, Half-Bridge Converter 64 or Push-Pull Converter 78 will be used to regulate 60 VDC Bus 70 which feeds F/W Bridge Converter 72. However, it is understood that Half-Bridge Converter 64 and Push-Pull Converter 78 can be any type of high switching-frequency DC-DC converter which operates from rectified Utility Power 62 or Battery 76, respectively. Half-Bridge Converter 64 and Push-Pull Converter 78 have input power applied simultaneously (unless Utility Power 62 is lost), and the outputs of Half-Bridge Converter 64 and Push-Pull Converter 78 are diode OR'ed in such as fashion that Half-Bridge Converter 64 or Push-Pull Converter 78 can independently provide the DC voltage required at 60 VDC Bus 70 in order that F/W Bridge Converter 72 can produce AC Output 74.

In parallel with the AC mains chain is the battery operated Push-Pull Converter 78 which is under the control of Pulse-Width Modulator 86. Push-Pull Converter 78 generates DC regulated voltage by utilizing high switching frequencies (for example, but not limited to, approximately 20 Kilohertz to more than approximately 100 Kilohertz). This is depicted with Switching Transformer 80 and Isolation Diode and Rectifier 82.

Unlike the typical off-line UPS, however, Push-Pull Converter 78 has battery power applied at all times and is always capable of instantaneously supplying power to F/W Bridge Converter 72. The reason that it is not doing so when Utility Power 62 is available is that Error Amplifier 92 is designed to favor Half-Bridge Converter 64 in maintaining 60 VDC Bus 70 and will drive Push-Pull Converter 78 into maintaining regulation only when Half-Bridge Converter 64 can not meet the needs, such as when there is a Power Utility 62 outage and no rectified DC power is available at the output of Half-Bridge Converter 64. The control of Push-Pull Converter 78 is via Amplifier 88 and the control of Half-Bridge Converter 64 is via Amplifier 90, both of which are driven by Error Amplifier 92. Amplifier 90 has as an input Offset Voltage 110 which is designed to "favor" Half-Bridge Converter 64.

As a result of Half-Bridge Converter 64 and Push-Pull Converter 78 being simultaneously powered and operational, there is no dropout nor droop in the UPS 60 VAC Output 74 when a power outage occurs at Utility Power 62, since all that is required for Push-Pull Converter 78 to come on-line is for the output voltage of Error Amplifier 92 to shift slightly and overcome the effect of Offset Voltage 110. This also is beneficial in that Battery 76 can help overcome startup current surges and sudden droops or dropout transients in Utility Power 62, and then just as quickly return to the off-line state.

Figure 4:
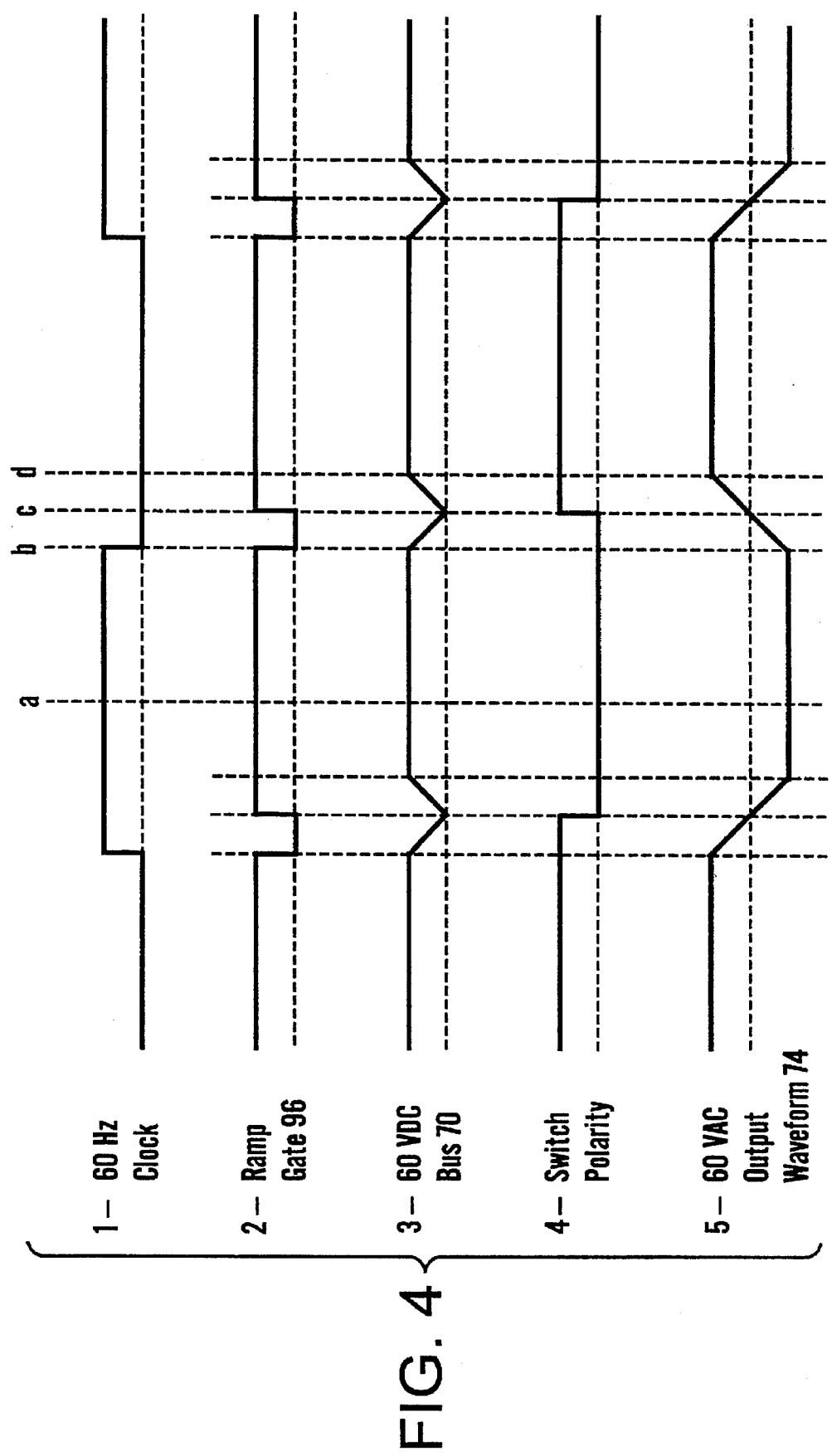
FIG. 4 is a graph of 60 Hz generator waveforms, according to the preferred embodiment of the present invention.

Referring to FIG. 4, assume that the instantaneous time in UPS operation is time a. Power is being supplied by Utility Power 62, Half-Bridge Converter 64 is operational and is delivering power to 60 VDC Bus 70 and thence to the input of F/W Bridge Converter 72. F/W Bridge Converter 72 is in the polarity-inverting state and AC Output 74 is of negative polarity 60 volts.

The 120 PPS Pulse Generator 104 is the actual clock for 60 Hz production; because it is necessary to perform the same operations at each instance of alternation of the output polarity, the pulse generator operates at 120 Hz. The R/S (Reset/Set) Latch 103 is a two-input type of switch—one input turns R/S Latch 103 ON and the other input turns R/S Latch 103 OFF. One of the two inputs to R/S Latch 103 is the pulse from 120 PPS Pulse Generator 104; the other input is the output signal of the Voltage Comparator 96. Therefore, R/S Latch 103 is in effect turned on by each pulse of 120 PPS Pulse Generator 104, and it is turned off by the output signal of Voltage Comparator 96. The output signal of R/S Latch 103 controls operation of Ramp Generator 102. It should be noted that although latch 103 has been described as a R/S latch, also known as a R/S Flip Flop or R/S multivibrator, other latch types such as a J-K Flip Flop may also be used.

Voltage Comparator 96 monitors the 60 VDC Bus 70. When the voltage of 60 VDC Bus 70 falls to a level below that of Transition Reference Voltage 100, the output of Voltage Comparator 96 switches from low to high. As the 60 VDC Bus 70 goes above Transition Voltage Reference 100, the output of Voltage Comparator 96 switches back to normal. The output of the Voltage Comparator 96 feeds both R/S Latch 103 and the 60 Hz Square Wave Generator 94.

Ramp Generator 102 reduces, or "ramps down", the output of the Reference Voltage Modulator 106. In practice, these two units work together to reduce the reference voltage applied to the input of Error Amplifier 92 by Reference Voltage Modulator 106 and then to raise it again to its set reference value of approximately 5 volts DC. Operation of Ramp Generator 102 and Reference Voltage Modulator 106 in the power supply may be likened to an automatic speed control on an automobile which keeps the car at a fixed speed until the brake pedal is touched, at which time the car de-accelerates, and then restores the car to the preset speed when the "resume" button is pushed. In the UPS of the present invention, the 120 PPS Pulse Generator 104 "sets" the R/S Latch 103 at time "b" (analogous to touching the brake pedal), and the 60 VDC Bus 70 follows the reference voltage down proportionally towards zero, shown from time "b" to time "c" in FIG. 4. When the 60 VDC Bus 70 reaches a preset minimum value, determined by Transition Voltage Reference 100, the Voltage Comparator 96 produces an output voltage which resets (turns off) the R/S Latch 103, at time "c". This is analogous to hitting "resume" on the automobile speed control. At the same time, the output of Voltage Comparator 96 also toggles the 60 Hz Square Wave Generator 94 to its alternate output phase, which changes the polarity of the 60 VAC output voltage 74. Between times "c" and "d", Ramp Generator 102 and Reference Voltage Modulator 106 allow the error amplifier reference input of Error Amplifier 92 to rise to its setpoint of +5 volts at time "d".

At the next half cycle of 120 PPS Pulse Generator 104, the above operation is repeated, this time with F/W Bridge Converter 72 once again producing negative voltage and so forth ad infinitum. This procedure provides for cyclic adjustment of the reference voltage which sets 60 VDC Bus 70 in such a way as to ramp down 60 VDC Bus 70 to zero volts and back up again to the required value at a 120 Hz repetition rate. Polarity reversal in F/W Bridge Converter 72 is performed at the instant of minimum or zero voltage as described above, and this results in much lower switching losses and stress in F/W Bridge Converter 72. It also results in lower electromagnetic interference (EMI) and higher switching efficiency, and these constitutes an improvement over equipment now in the field. On battery operation the same operation takes place, except that 60 VDC Bus 70 is maintained by Push-Pull Converter 78 rather than Half-Bridge Converter 64.

Figure 5:
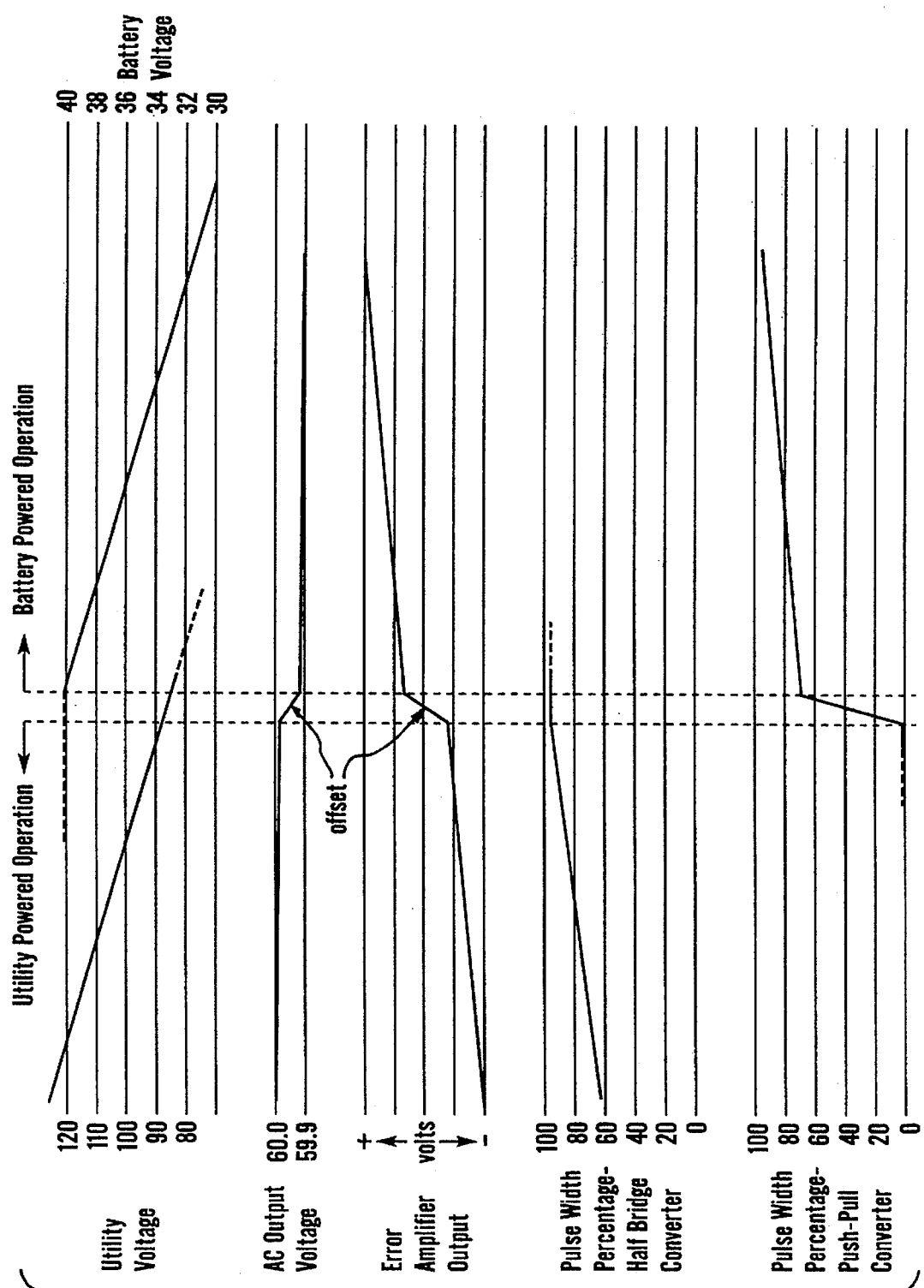
FIG. 5 is a graph of UPS regulation characteristics, according to the preferred embodiment of the present invention.

During the presence of Utility Power 62, regulation of 60 VDC Bus 70 is maintained by sampling 60 VDC Bus 70 through a resistive divider network which is not shown but which is effectively part of Error Amplifier 92, and comparing that proportional voltage to the output of Reference Voltage Modulator 106. The output of Error Amplifier 92 is routed to Amplifier 88 and Amplifier 90. Amplifier 90 has Offset Voltage 110 applied to one of its inputs such that Amplifier 90 begins to function at a lower input voltage than Amplifier 88. Amplifier 90 controls Pulse-Width Modulator 84 which controls Half-Bridge Converter 64. A slight decrease in 60 VDC Bus 70, and therefore in AC Output 74, will cause a large shift in the output of Error Amplifier 92. This decrease in DC voltage, which is usually caused by variation in Utility Power 62 (as shown in graph 1 of FIG. 5), will increase the width of the pulse-width modulated control signal applied to Half-Bridge Converter 64, thereby compensating for 60 VDC Bus 70 droop (see graphs 2 and 3 of FIG. 5).

Although Push-Pull Converter 78 and Pulse-Width Modulator 86 are also controlled by the output of Amplifier 88, which is related to the output of Error Amplifier 92, the offset applied to the Half-Bridge Converter 64 path is such as to hold off Push-Pull Converter 78 from providing power if the output of Half-Bridge Converter 64 can maintain regulation of 60 VDC Bus 70.

If Half-Bridge Converter 64 is incapable of maintaining 60 VDC Bus 70 within the regulation limits, Error Amplifier 92 will increase its output a sufficient amount to overcome Offset Voltage 110. This is shown in the middle of the graphs of FIG. 5. Push-Pull Converter 78 will now be driven to the extent necessary to hold 60 VDC Bus 70 within regulation limits until Half-Bridge Converter 64 can provide power. The following conditions will cause Push-Pull Converter 78 operation to occur: complete loss of Utility Power 62, Utility Power 62 brownout to the extent that Half-Bridge Converter 64 cannot maintain regulation of 60 VDC Bus 70, droops or load surges on Utility Power 62, sudden load transients, such as turn on surges caused by load power-up, where the protective current limiting in Half-Bridge Converter 64 restricts its ability to provide full needed power and Push-Pull Converter 78 is driven on to assist in maintaining regulation of 60 VDC Bus 70, and deliberate shut-down of Half-Bridge Converter 64 (for example by a control operator for system testing).

In summary, both Half-Bridge Converter 64 and Push-Pull Converter 78 are under control of the same feedback regulation loop except that the loop first tries to raise the output of the Half-Bridge Converter 64 in the event of a reduction in 60 VDC Bus 70, and if the DC required can not be supported by Half-Bridge Converter 64 (through loss of the mains, or severe brown-out conditions), the loop forces battery operated Push-Pull Converter 78 to maintain the required 60 VDC Bus 70 level. Otherwise, the battery operated Push-Pull Converter 78 is biased off by the loop and consumes no power from Battery 76. Therefore, transfer from the utility-powered Half-Bridge Converter 64 to battery-powered Push-Pull Converter 78 is achieved by a slight shift in the operating point of the regulation loop which occurs well before a significant drop in 60 VDC Bus 70 can occur. Retransfer when Power Utility 62 again becomes available is just as smooth and rapid. As a result, there is no relay or other switching when transferring between Utility Power 62 and Battery 76 power. This is in contrast to present UPS systems which employ relays or solid-state switching devices that can produce damaging switching transients and surges during transitions. Since all converter switching is done at high frequencies, UPS response to load and line changes is extremely rapid. Heavy 60 Hz transformers are not required. The point at which backup power starts to be applied is also easily adjusted, as it is controlled by an internal offset voltage.

Figure 1:
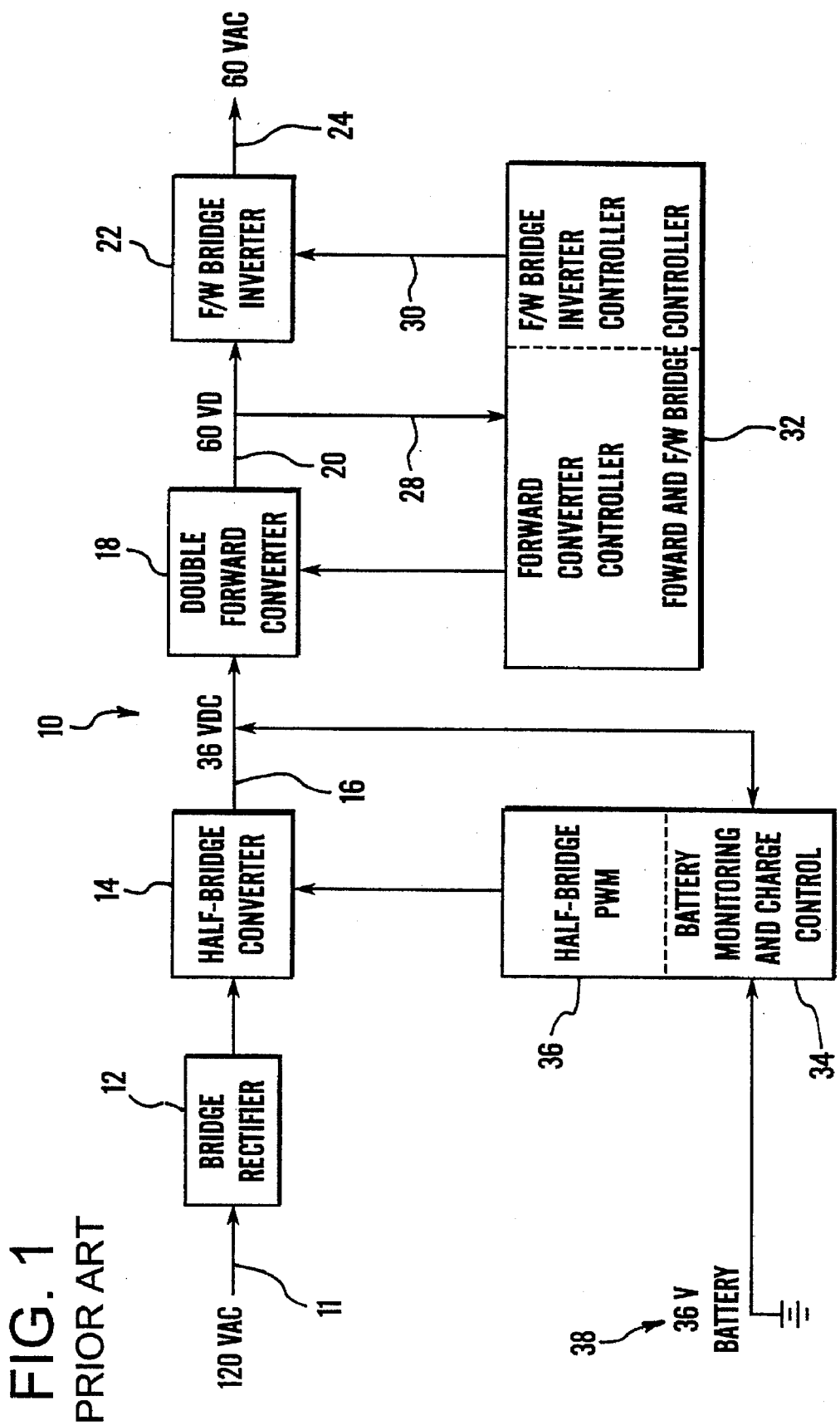
FIG. 1 is a fully on-line UPS configuration, according to the prior art.
Figure 2:
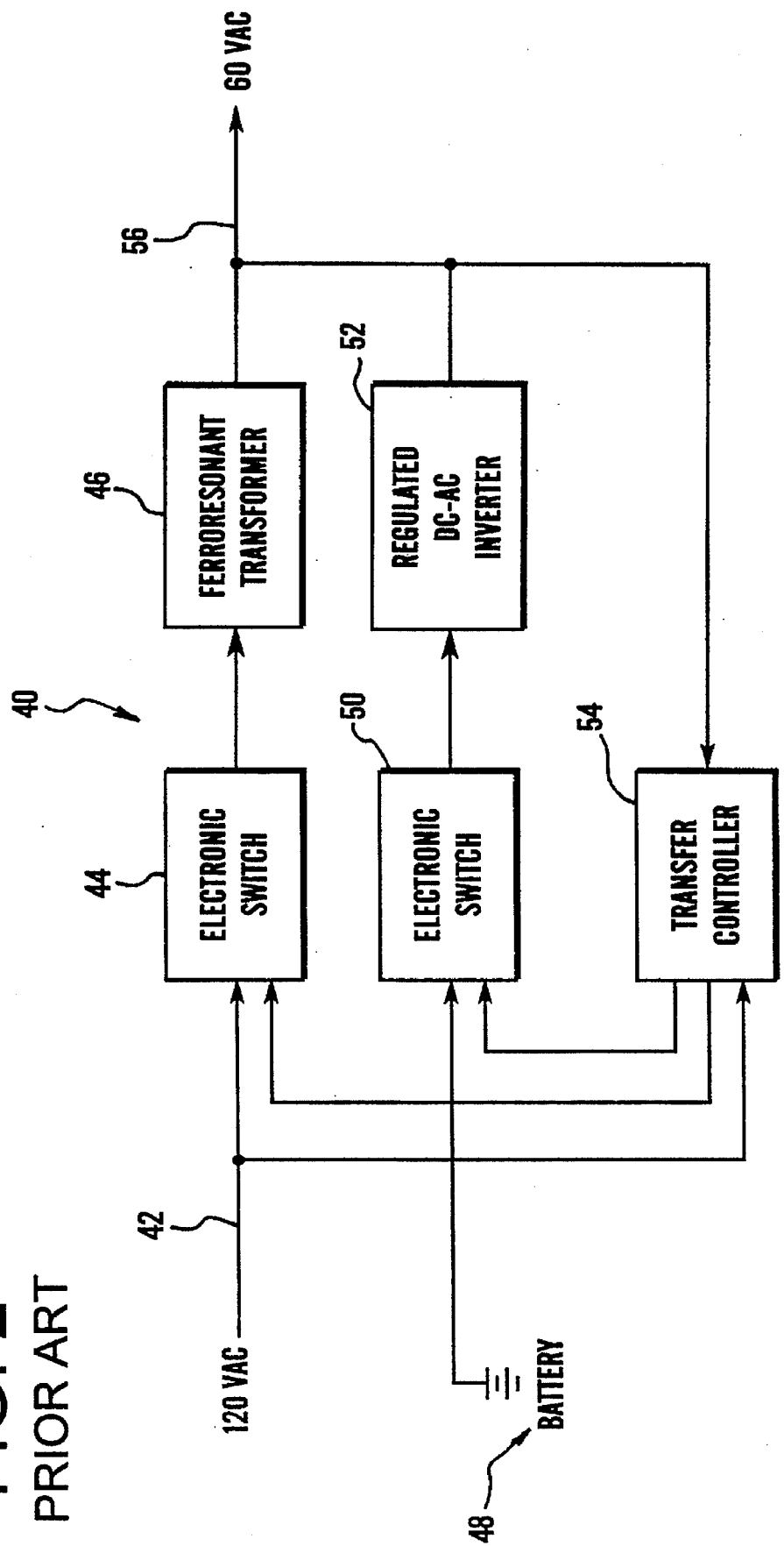
FIG. 2 is a typical off-line, non-switching UPS configuration, according to the prior art.

Note that the Double Forward Converter 18 of FIG. 1 has been removed from the power chain for the AC mains operation of the present invention, so the operating losses of that element are eliminated resulting in increased efficiency comparable to the off-line UPS configuration of FIG. 2. Since only one DC-DC converter is supplying power at a time the potential for EMI problems is reduced.

Some AC power backup UPS systems, for example those for computers and other equipment, must recreate an output waveform which closely resembles a sinusoidal waveform. The simplest units will use a pair of transistor switches to apply battery voltage to alternate polarity windings of a power transformer at a 60 Hz rate. A resonating filter section will round the square waves into an approximate sinusoidal shape. More elaborate Units produce a dead time between switch transitions giving a "stepped" waveform which is easier to filter and places less strain on the switching transistors. A pulse width modulating switching waveform may be employed in higher power systems. This invention may be applied to sinusoidal requirements by the replacement of the Ramp Generator 102 with a half-sinusoid (cosine) reference voltage generator triggered directly by the 120 PPS Pulse Generator 104. The Voltage Comparator 96 would be eliminated, and the 60 Hz Square Wave Generator 94 would be toggled by the 120 PPS Pulse Generator 104. Different waveforms may also be generated by applying the required waveshape to Voltage Reference 108 of FIG. 3.

The CATV application does not require a pure sine wave output. In fact, the ferroresonant transformer UPS typically provides what is called a "quasi-square wave" output which resembles a sine wave with its peaks cut off, or truncated. The closer that this waveform gets to a true square wave the better, since power is not effectively delivered during the rise and fall times of the waveform. However, use of a pure square wave produces higher-order harmonics which produce EMI. Therefore, the production of a square wave with shaped rise and fall times achieves the best compromise. This invention incorporates control of the output waveform rise and fall times by modulation of the DC power bus in a simple, low-power manner.

Line frequency variations will not result in transfer to battery operation, since UPS AC timing is governed by internal frequency standard 104. Therefore, this UPS technology is usable with small (unstable) generators, a capability which is not available with present switching and ferroresonant transformer UPS systems.

While the invention has been particularly shown and described with reference to a preferred embodiment, it will be understood by those skilled in the art that various changes in form and detail may be made therein without departing from the spirit and scope of the invention. For instance, while the UPS of the present invention produces a 60 VAC output signal 74, it is fully anticipated that the present invention may be utilized to produce any desired AC voltage output signal. Thus, the present invention may be utilized to produce 90 VAC which is expected to be used by new generation CATV systems.

What is claimed is:

1. An Uninterruptible Power Supply (UPS) structure, comprising:

a first DC-DC converter, having a rectified utility power AC input signal, which produces an output signal;

a second DC-DC converter, having a power input signal, which produces an output signal, wherein the rectified utility power AC input signal and the power input signal are applied simultaneously to the first DC-DC converter and the second DC-DC converter, respectively, and wherein the output signal of the first DC-DC converter is coupled to the output signal of the second DC-DC converter by a diode OR'ed connection;

a regulated DC voltage generated by the first DC-DC converter when the rectified utility power AC input signal is above a predetermined voltage level and generated by the second DC-DC converter when the rectified utility power AC input signal is below the predetermined voltage level, such that a constant value of the regulated DC voltage is maintained;

a battery source, which provides the power input signal to the second DC-DC converter;

a feedback regulation loop coupled to the first DC-DC converter and the second DC-DC converter that ensures that the regulated DC voltage is maintained at a desired voltage level, wherein upon a reduction of the regulated DC voltage below the desired voltage level the feedback regulation loop first raises the value of the output signal of the first DC-DC converter in an attempt to maintain the regulated DC voltage at the desired voltage level and if the regulated DC voltage is still below the desired voltage level, the feedback regulation loop forces the second DC-DC converter to maintain the regulated DC voltage at the desired voltage level; and a DC-AC converter, having the regulated DC voltage as a first input signal and a waveform output of a wave generator of the feedback regulation loop as a second input signal, which converts the regulated DC voltage to generate an AC output signal of the Uninterruptible Power Supply.

2. The structure of claim 1, wherein the feedback regulation loop further comprises:

a comparator, having the regulated DC voltage as a first input signal and a transition voltage reference as a second input signal, which produces a compare output signal;

the wave generator, having the compare output signal of the comparator as an input signal, which produces the waveform output;

a pulse generator which produces a pulse signal;

a latch having the compare output signal of the comparator as a first input signal, the pulse signal of the pulse generator as a second input signal, and an output signal;

a ramp generator having the output signal of the latch as an input signal and generating an output signal;

a reference voltage modulator having the output signal of the ramp generator as a first input signal and a voltage reference as a second input signal and producing an output signal;

a first amplifier, having the regulated DC voltage as a first input signal and the output signal of the reference voltage modulator as a second input signal, which compares the first input signal and the second input signal to produce an output signal;

a second amplifier which is driven by the output signal of the first amplifier and which produces an output signal;

a third amplifier having the output signal of the first amplifier as a first input signal, an offset signal as a second input signal, and producing an output signal, wherein the offset signal causes the third amplifier to operate at a lower input voltage than the second amplifier, and wherein if the rectified utility power AC input signal is below the predetermined voltage level the first amplifier increases its output signal sufficiently to overcome the offset signal;

a first pulse-width modulator having the output signal of the second amplifier as an input signal and producing a first control signal which controls the first DC-DC converter; and a second pulse-width modulator having the output signal of the third amplifier as an input signal and producing a second control signal which controls the second DC-DC converter;

wherein during a half-cycle of the pulse signal, the pulse generator sets the latch and the regulated DC voltage proportionally tracks the voltage reference towards a minimum voltage level determined by the transition voltage reference, and when the regulated DC voltage is approximately equal to the minimum voltage level, the compare output signal of the comparator resets the latch and toggles the wave generator to reverse a first polarity of the DC-AC converter to a second polarity so that the AC output signal is a positive value as the regulated DC voltage rises to a desired voltage level.

3. The structure of claim 1, wherein a rectifying element rectifies a utility power source signal to produce the rectified utility power AC input signal.

4. The structure of claim 1, wherein the first polarity of the DC-AC converter is a positive polarity and the second polarity of the DC-AC converter is a negative polarity.

5. An Uninterruptible Power Supply (UPS) structure, comprising:

a first DC-DC converter, having a rectified utility power AC input signal, which produces an output signal;

a second DC-DC converter, having a power input signal, which produces an output signal, wherein the rectified utility power AC input signal and the power input signal are applied simultaneously to the first DC-DC converter and the second DC-DC converter, respectively, and wherein the output signal of the first DC-DC converter is coupled to the output signal of the second DC-DC converter by a diode OR'ed connection;

a regulated DC voltage generated by the first DC-DC converter when the rectified utility power AC input signal is above a predetermined voltage level and generated by the second DC-DC converter when the rectified utility power AC input signal is below the predetermined voltage level, such that a constant value of the regulated DC voltage is maintained;

a battery source, which provides the power input signal to the second DC-DC converter;

a comparator, having the regulated DC voltage as a first input signal and a transition voltage reference as a second input signal, which produces a compare output signal;

a wave generator having the compare output signal of the comparator as an input signal and producing a waveform output signal;

a pulse generator which produces a pulse signal;

a latch having the compare output signal of the comparator as a first input signal, the pulse signal of the pulse generator as a second input signal, and an output signal;

a ramp generator having the output signal of the latch as an input signal and generating an output signal;

a reference voltage modulator, having the output signal of the ramp generator as a first input signal and a voltage reference as a second input signal, which produces an output signal;

a first amplifier, having the regulated DC voltage as a first input signal and the output signal of the reference voltage modulator as a second input signal, which compares the first input signal and the second input signal to produce an output signal;

a second amplifier which is driven by the output signal of the first amplifier and which produces an output signal;

a third amplifier, having the output signal of the first amplifier as a first input signal and an offset signal as a second input signal, which produces an output signal, wherein the offset signal causes the third amplifier to operate at a lower input voltage than the second amplifier, and wherein if the rectified utility power AC input signal is below the predetermined voltage level the first amplifier increases its output signal sufficiently to overcome the offset signal;

a first pulse-width modulator having the output signal of the second amplifier as an input signal and producing a first control signal which controls the first DC-DC converter;

a second pulse-width modulator having the output signal of the third amplifier as an input signal and producing a second control signal which controls the second DC-DC converter; and a DC-AC converter, having the regulated DC voltage as a first input signal and the waveform output signal of the wave generator as a second input signal, which converts the regulated DC voltage to generate an AC output signal of the UPS, wherein during a half-cycle of the pulse signal, the pulse generator sets the latch and the regulated DC voltage proportionally tracks the voltage reference towards a minimum voltage level determined by the transition voltage reference, and when the regulated DC voltage is approximately equal to the minimum voltage level, the compare output signal of the comparator resets the latch and toggles the wave generator to reverse a first polarity of the DC-AC converter to a second polarity so that the AC output signal is a positive value as the regulated DC voltage rises to a desired voltage level.

6. The structure of claim 5, wherein a rectifying element rectifies a utility power source signal to produce the rectified utility power AC input signal.

7. The structure of claim 6, wherein the rectifying element is a rectifier.

8. The structure of claim 5, wherein the first DC-DC converter is a high switching-frequency half-bridge converter and the second DC-DC converter is a high switching-frequency push-pull converter.

9. The structure of claim 5, wherein the first DC-DC converter comprises a first switching transformer and a first isolation diode which utilize a high frequency in order to generate the regulated DC voltage when the rectified utility power AC input signal is above the predetermined voltage level, and wherein the second DC-DC converter comprises a second switching transformer and a second isolation diode to utilize the high frequency in order to generate the regulated DC voltage when the rectified utility power AC input signal is below the predetermined voltage level.

10. The structure of claim 5, wherein the wave generator is a square wave generator.

11. The structure of claim 5, wherein the rectified utility power AC input is below the predetermined voltage level when the UPS is subject to a power outage.

12. The structure of claim 5, wherein the rectified utility power AC input is below the predetermined voltage level when the first DC-DC converter can not maintain regulation of the regulated DC voltage.

13. The structure of claim 5, wherein the rectified utility power AC input is below the predetermined voltage level when there is a droop or load surge on the utility power AC input.

14. The structure of claim 5, wherein the rectified utility power AC input is below the predetermined voltage level when the UPS is subject to a sudden load transient condition.

15. The structure of claim 5, wherein the rectified utility power AC input is below the predetermined voltage level when there is a shut-down of the first DC-DC converter.

16. The structure of claim 5, wherein the wave generator is a 60 Hz square wave generator.

17. The structure of claim 5, wherein the pulse generator is a 120 pulses per second (PPS) pulse generator.

18. The structure of claim 5, wherein the second predetermined voltage level is zero volts.

19. The structure of claim 5, wherein the first polarity of the DC-AC converter is a positive polarity and the second polarity of the DC-AC converter is a negative polarity.

20. The structure of claim 5, wherein when the waveform output signal of the wave generator toggles to reverse the first polarity of the DC-AC converter to the second polarity, the AC output signal is a quasi-square waveform.

21. The structure of claim 5, wherein the UPS is suitable for use in a cable television (CATV) application.

22. A method for generating a quasi-square wave output of an Uninterruptible Power Supply (UPS), comprising the steps of:

generating a direct-current (DC) regulated voltage at a high frequency, wherein generating the DC regulated voltage is performed by a first DC-DC converter of the UPS when a utility power input signal of the UPS is greater than a predetermined voltage level and wherein generating the DC regulated voltage is performed by a second DC-DC converter of the UPS when the utility power input signal is less than the predetermined voltage level;

cyclically adjusting a reference voltage which sets the DC regulated voltage in order to ramp down the DC regulated voltage to a minimum voltage level and then ramp the DC regulated voltage back up to a desired voltage level; and applying a DC voltage to a polarity reversal switch of the UPS to change a polarity of an output signal of the polarity reversal switch periodically, thereby producing a quasi-square alternating current (AC) output waveform of the UPS.

23. The method of claim 22, wherein the step of cyclically adjusting the reference voltage occurs at a 120 Hertz repetition rate.

24. The method of claim 22, wherein the polarity reversal switch is a DC-AC converter.

25. The method of claim 24, wherein the DC-AC converter is a Full-Wave Bridge converter.

* * * * *

UNITED STATES PATENT AND TRADEMARK OFFICE
CERTIFICATE OF CORRECTION

PATENT NO. : 5,635,773 Page 1 of 1
APPLICATION NO. : 08/518237
DATED : June 3, 1997
INVENTOR(S) : Kenneth L. Stuart It is certified that error appears in the above-identified patent and that said Letters Patent is hereby corrected as shown below:

In Claim 2, column 9, lines 53-54: the text "first DC-DC converter" should read --second DC-DC converter--.

In Claim 2, column 9, lines 57-58: the text "second DC-DC converter" should read --first DC-DC converter--.

In Claim 5, column 10, lines 66-67: the text "first DC-DC converter" should read --second DC-DC converter--.

In Claim 5, column 11, lines 3-4: the text "second DC-DC converter" should read --first DC-DC converter--.

Signed and Sealed this

Twenty-seventh Day of February, 2007

JON W. DUDAS
*Director of the United States Patent and Trademark Office*